(No Model.)

J. S. SACKETT.
HEMSTITCH ATTACHMENT FOR SEWING MACHINES.

No. 292,060. Patented Jan. 15, 1884.

Witnesses.
J. H. Shumway
Jos. C. Earle

Jos. S. Sackett
Inventor
By Atty.
Wm. Earle

UNITED STATES PATENT OFFICE.

JOSEPH S. SACKETT, OF NEW HAVEN, CONNECTICUT, ASSIGNOR OF ONE-HALF TO JANE HALLIWELL, OF SAME PLACE.

HEMSTITCH ATTACHMENT FOR SEWING-MACHINES.

SPECIFICATION forming part of Letters Patent No. 292,060, dated January 15, 1884.

Application filed October 31, 1883. (No model.)

*To all whom it may concern:*

Be it known that I, JOSEPH S. SACKETT, of New Haven, in the county of New Haven and State of Connecticut, have invented a new Improvement in Hemstitch Attachments for Sewing-Machines; and I do hereby declare the following, when taken in connection with accompanying drawings and the letters of reference marked thereon, to be a full, clear, and exact description of the same, and which said drawings constitute part of this specification, and represent, in—

Figure 1:
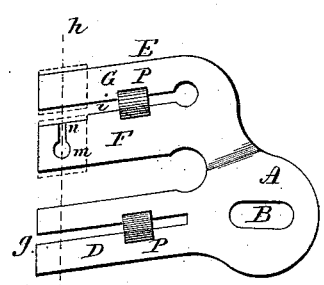
Figure 2:
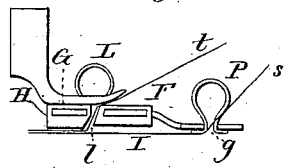
Figure 3:
Figure 4:
Figure 5:
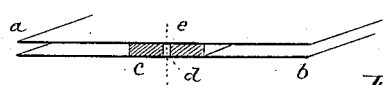
Figure 6:
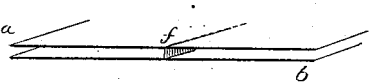
Figure 7:

Figure 1, a top view of the attachment complete; Fig. 2, an end view of the same; Figs. 3 and 4, the removable sleeves H I; Figs. 5, 6, and 7, diagrams to illustrate the operation of the invention.

This invention relates to a device for attachment to sewing-machines, whereby a stitch in imitation of what is known as "hemstitch" is produced. The stitching is produced by running two strips of fabric through the machine, with a separator between the two, and through which the stitches will pass, so that the stitch will not draw the two thicknesses close together, and after the two thicknesses have been thus stitched they are both doubled at the stitching, to form two parallel edges connected by the line of stitches which has been run through the two thicknesses. To illustrate, in Fig. 5, *a* represents one thickness; *b*, the second thickness; *c*, the separating device between the two thicknesses, and through which is a slot, *d*. Now, if a line of stitches be run, as indicated at *e*, through the two thicknesses, the two thicknesses will be connected by the stitches, as seen in Fig. 6, *f* representing the stitches. After the two strips have been thus stitched together, each is doubled at the line of stitches, but in opposite directions, as seen in Fig. 7, forming a double edge at the line of stitches on each part, and the two edges parallel to each other connected by the stitches *f*, which give to the seam the appearance of a hemstitch.

The object of the invention is to construct a guiding mechanism which may be applied to a common sewing-machine, as is the usual sewing-guide, and serve to conduct the two strips of material, properly separated, to the needle; and the invention consists in the construction of the attachment, as hereinafter described, and more particularly recited in the claims.

The attachment is made from a piece of sheet metal, A representing the base or head by which it is attached to the work-plate of the machine, B the slot through which the set-screw is introduced in like manner as through the slot in the usual sewing-machine guide. From this base an arm, D, extends, and in this arm is a slot, *g*, running from the outer end inward and diagonal to the line of stitches, the line of stitches being represented by the broken line *h*, the inclination being forward. A second arm, E, is formed parallel to the arm D, but should be elevated somewhat above the arm D, so that the plane of the arm E is above the plane of the arm D. In this arm E is a slot, *i*, parallel to the slot *g* of the other arm. This slot forms two divisions, F and G. Onto the end of one division, G, I set a sleeve, H, which holds with sufficient friction to retain its place, and onto the other division, F, I place a similar sleeve, I. The forward edge of the sleeve I inclines forward, and the rear edge of the sleeve H is correspondingly inclined, so as to form between them a forwardly-inclined slot, *l*, as seen in Fig. 2. Through the division F of the arm E is the needle-hole *m*, and from it a slot, *n*, leads into the slot *i*, and in the sleeve I is a corresponding needle-hole, *o*, and slot *r*, as seen in Fig. 4.

The attachment is placed upon the sewing-machine table, and so as to bring the sleeve H directly beneath the presser-foot, as shown, L representing the presser-foot. This sleeve H therefore rides upon the feed and serves the purpose of the presser-foot, so far as feeding is concerned, and to hold the work in proper position therefor. The under strip, *s*, of the material is introduced through the slot *g* and passed forward beneath the sleeve H. The second strip, *t*, is introduced between the two sleeves, and passes down through the slot *l* and forward beneath the sleeve H, as shown. The stitching of the two strips is then made through the sleeve I, this sleeve serving as the separator for the two strips. The stitches as they are made pass forward through the slot r, caused so to do by the feed working in conjunction with the sleeve H, and substantially as in common sewing-machine feeding. The thickness of the sleeve I limits the separation of the two strips, or the distance between their two folded edges when the work is complete, as before described. Now, if a greater distance be required between the two edges, I remove the sleeves I and H, and substitute therefore other sleeves thicker and corresponding to the broader open seam required. If, on the contrary, a narrower open seam be required, I replace the sleeves I H by correspondingly-thinner sleeves. Therefore, by making the sleeves I H removable and interchangeable with other sleeves, I am enabled to adapt the single attachment to various widths of seams. By inclining the slots g i in the guide forward, as described, the strips passing through them are thereby inclined to run inward from the line of stitches, and until they meet resistance, and meeting that resistance are then held at that point without inclination to change their relation to the line of stitches. If the extreme end of the slot be that guide, then the strips will run constantly against that end as a guide.

To adapt the attachment for various widths of strips, I arrange a spring-slide, P, in slots, one or both, as the case may be. These spring-slides are made from thin elastic material bent into horseshoe shape, with a flange at each end, and then the open side pressed together until the compressed slide will pass into the slot, as seen in the slot g, Fig. 2, the reaction of the spring serving to hold them in close engagement with the sides of the slot, so as not to be easily displaced, but so that they may be moved to the right or left in the slots, as occasion may require. The strips work against the edge of the guides next the line of stitches. The arm D should bear with considerable force upon the under strip, in order to prevent the feed from moving it faster than the upper strip, and thereby shirring to some extent that under strip. This guide, while designed specially for hemstitch-work, may be employed as a guide for stitching two strips of material together, one strip so passing through the slot s, and the other under strip passing beneath the rear portion of the bar D, the two coming together beyond the slot, and thence led to the needle. The inclination of the slot D will serve to hold the upper strip against its guide, and retain it in its proper relative position to the under piece and to the line of stitches; or the work may run beneath the arm D and the under projections of the guide P serve as a shoulder against which the edge of the work will run. Thus I adapt the attachment to various kinds of work.

The ends of the parts E and F of the forward arm may be constructed as if the two sleeves were permanent thereon, and so that the forward portion will stand between the work-plate and presser-foot, and the other in rear of it as a separator, and so as to leave a slot between the two.

Instead of running the under strip through the slot in the arm D, it may pass entirely beneath that arm—that is, the slot in the arm D may be dispensed with.

I claim—

1. A guide for sewing-machine work, consisting of an arm having a slot in line across the path of the needle, combined with the spring-guide P, of horseshoe shape, the opening in the spring-guide parallel with the slot, the two ends extending through the slot and turned at right angles to the slot, and whereby the elasticity of the horseshoe-shaped guide P holds it in position in said slot, yet admits of its adjustment, substantially as described.

2. The combination of the two connected arms D E, the arm E divided by a slot in line across the path of the needle, the two divisions provided the one with a removable sleeve, H, and the other with a removable sleeve, I, the one I constructed with a needle-hole, o, and slot, r, leading forward therefrom, substantially as and for the purpose described.

3. The combination of the two connected arms D E, each constructed with a slot diagonal to the path of the needle, the forward part of the arm E provided with a bearing to stand between the presser-foot and work-table, the other part provided with a separator, and so as to leave a slot, l, forward of the separator, substantially as described.

JOSEPH S. SACKETT.

Witnesses:
JOS. C. EARLE,
J. H. SHUMWAY.